United States Patent [19]
Kato et al.

[11] Patent Number: 4,497,057
[45] Date of Patent: Jan. 29, 1985

[54] MOTOR VEHICLE DIAGNOSTIC MONITORING SYSTEM

[75] Inventors: Takaaki Kato, Toyohashi; Yoshio Hirano, Anjo; Takeshi Ochiai, Toyota; Seizi Ishikawa, Toyota; Kazunori Sakai, Toyota, all of Japan

[73] Assignees: Nippondenso Co., Ltd., Kariya; Toyota Jidosha Kabushiki Kaisha, Toyota, both of Japan

[21] Appl. No.: 405,903

[22] Filed: Aug. 6, 1982

[30] Foreign Application Priority Data

Aug. 7, 1981 [JP] Japan .................. 56-124234
Aug. 7, 1981 [JP] Japan .................. 56-124235
Aug. 7, 1981 [JP] Japan .................. 56-124236
Aug. 7, 1981 [JP] Japan .................. 56-124237

[51] Int. Cl.$^3$ .................. G06F 11/00; G06F 11/32
[52] U.S. Cl. .................. 371/29; 340/52 F; 364/431.04; 371/16
[58] Field of Search .................. 371/29, 16, 20; 364/431.04, 551; 340/52 R, 52 F

[56] References Cited

U.S. PATENT DOCUMENTS

| 3,805,038 | 4/1974 | Buedel et al. ...................... 371/29 X |
| 4,246,566 | 1/1981 | Endo et al. ........................ 340/52 F |
| 4,271,402 | 6/1981 | Kastura et al. .................... 340/52 F |
| 4,296,409 | 10/1981 | Whitaker et al. ................. 340/52 F |
| 4,339,801 | 7/1982 | Hosaka et al. ................. 364/431.04 |
| 4,376,298 | 3/1983 | Sokol et al. ........................ 364/551 |

Primary Examiner—Charles E. Atkinson
Attorney, Agent, or Firm—Cushman, Darby & Cushman

[57] ABSTRACT

A diagnostic monitoring system, for detecting and displaying malfunctions or abnormal operations occurring in various engine operation control computers, includes a microcomputer, actuators and sensors. Each of the engine operation control computers performs a diagnosis program as a part of their control programs and produces a signal whenever a malfunction or abnormal operation is detected. A central supervisory system receives such signals from the engine operation control computers and stores them separately for the individual control computers. A display unit displays the stored signals in response to instructions from the central supervisory system.

9 Claims, 28 Drawing Figures

| | | | | |
|---|---|---|---|---|
| (a) | E/G — 01 | | (i) | LIGHT  SW |
| (b) | A/C — 02 | | (j) | AUTO DRIVE |
| (c) | ESC — 03 | | (k) | A/D  100 KM |
| (d) | OK | | (l) | A/D  MAIN |
| (e) | HEAD LAMP | | (m) | S/W  60 KM |
| (f) | STOP LAMP | | (n) | 5600  RPM |
| (g) | RADIATOR | | (o) | BAT  13.5 V |
| (h) | IG KEY | | (p) | TEMP  25°C |

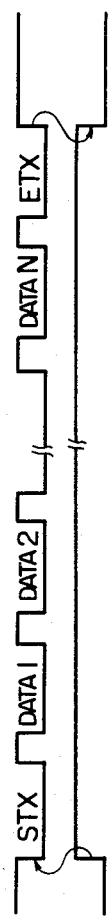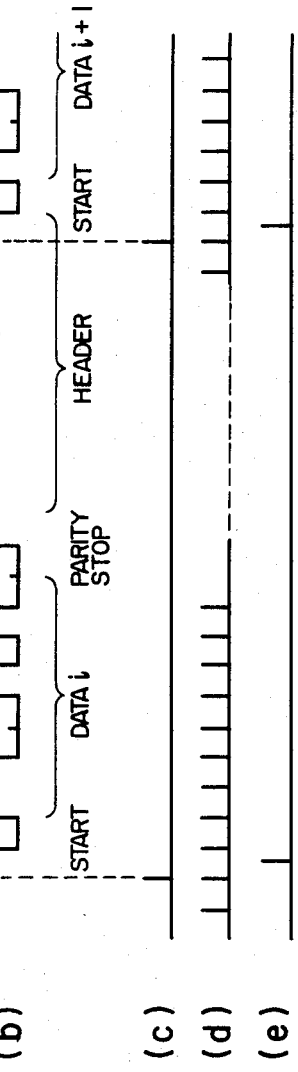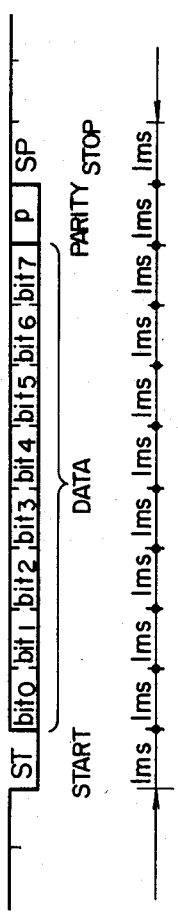
FIG. 13
FIG. 14
FIG. 15

MOTOR VEHICLE DIAGNOSTIC MONITORING SYSTEM

The present invention relates to a motor vehicle diagnostic monitoring system for detecting and displaying any malfunctions in the control systems incorporated in a motor vehicle.

In the past, there has been a system, called an OK monitor, for detecting and providing warning indications of such malfunctions as an insufficient oil level, insuffficient window washing liquid, head lamp failure, tail lamp failure, stop lamp failure, abnormal conditions in the charging system, etc. And, as the items to be checked, those which can be checked and repaired relatively easily by the ordinary driver are selected and thus this system is essentially a warning system intended for use by the ordinary driver.

However, the recent and new motor vehicles have been increasingly equipped with electronic instruments and complicated making it difficult to detect and locate troubles. For instance, one or more of control systems employing a microcomputer, e.g., a fuel injection control system, ignition control system, air-conditioner control system and automatic driving speed control system have recently been installed in one motor vehicle. Each of the control systems includes a plurality of sensors and a plurality of actuators and the control of the system is effected in a sophisticated manner by effectively using the advantageous features of the microcomputer in accordance with a control program stored in a memory which is incorporated in the control system.

When any malfunction occurs in the course of the control by such a complicated control system having a large number of sensors and actuators, it is difficult to recognize the malfunction if its degree of abnormality is low. Also, any of various conditions or a combination of these conditions may be considered as the cause of the malfunction and the detection of the true cause becomes more difficult as the operating logic according to the control program becomes more complicated so far as the control system is diagnosed externally. Also, in the case of malfunctions which occur intermittently, it is not easy to detect and confirm their causes in a repair shop.

With a view to overcoming the foregoing deficiencies in the prior art, it is the primary object of the present invention to provide a motor vehicle diagnostic monitoring system in which each of a plurality of control systems adapted to execute control separately in accordance with predetermined control programs is provided with a function of detecting any malfunction (or abnormal operation) in the control operation of the control system itself and generating a malfunction indicative (or abnormal operation) signal, whereby the plurality of control systems are enabled to detect separately and positively the occurrence of any malfunction (or abnormal operation) even if the degree of its abnormality is low.

In accordance with one form of the invention, a plurality of control systems are each provided with a function of detecting any malfunction in the control system itself and generating a malfunction signal and a centralized supervisory system performs a centralized supervisory control on the occurrence of malfunction (abnormal operation) signals from the plurality of control systems and causes a display unit to display abnormal operation data in response to the generation of abnormal operation signals, thereby alerting the vehicle driver to abnormal operations in any particular ones of the plurality of control systems installed on the vehicle. Also, the centralized supervisory control of the presence or absence of malfunction signals from the control systems enables the single display unit to selectively display the occurring abnormal operation data and assign priorities to the display of these malfunctions.

In accordance with another aspect of the invention, each of the control systems detects any malfunction in the control of the control system itself and generates a malfunction signal in accordance with a diagnostic program forming a part of the control program, and the centralized supervisory system performs a centralized supervisory control on the occurrence of malfunction signals from the control systems, stores the malfunction data corresponding to the occurrence of malfunction signals separately for each of the control systems and responds to the generation of a command from command generating means to cause the display unit to display the contents of the malfunctions occurred on the basis of the stored malfunction data, whereby the contents of the malfunctions occurred in any particular ones of the control systems installed on the vehicle are displayed only when required by a command requesting operation to the command generating means and the driver of the vehicle is easily alerted to the contents of the malfunction occurred. Also, by arranging so that the malfunction data stored in the centralized supervisory system are reset by reset means, it is possible to store only the malfunction data corresponding to the malfunction signals generated newly after the alerting of the driver to the contents of the malfunctions occurred previously and display the contents of the newly occurred malfunctions.

In accordance with still another aspect of the invention, the centralized supervisory control of the occurrence of malfunction signals from the plurality of control systems is effected by storing the malfunction data corresponding to the occurrence of malfunction signals separately for each of the control systems in first and second memory areas, resetting the malfunction data stored in the first and second memory areas at first and second predetermined timings from the time of the last occurrence of malfuction signals, causing the display unit to display the contents of the first malfunctions in accordance with the malfunction data stored in the first memory area upon generation of a first command from the command generating means and causing the display unit to display the contents of the second malfunctions in accordance with at least the malfunction data stored in the second memory area upon generation of a second command from the command generating means. By so doing, the contents of the malfunctions occurred in any particular ones of the control systems installed on the vehicle can be displayed only when required by a command requesting operation to the command generating means and the driver can be easily alerted to the malfunction contents. Since the contents of malfunctions occurring at different times are displayed in response to first and second commands from the command generating means, the driver can also be alerted separately to the occurrence of the malfunctions as occasion demands.

In accordance with still another aspect of the invention, particular ones of the plurality of control systems are provided with a function of generating condition signals corresponding to the operating conditions of a part to be controlled and the centralized supervisory system is adapted to selectively generate condition display signals corresponding to the condition signals and malfunction display signals corresponding to the malfunction signals and thereby to alternatively display the operating conditions and the malfunction contents of the controlled part thus making it possible to effectively utilize the display space of the display means.

The present invention will be apparent from the following detailed description taken in conjunction with the accompany drawings, in which.

FIGS. 12(a)–12(i), 13(a), 13(b) and 14(a)–14(e) are timing charts useful for explaining the operation of the embodiment; and FIG. 15 is a diagram showing the format of a serial transmitting data.

The present invention will now be described in greater detail with reference to the illustrated embodiment.

Figure 1:
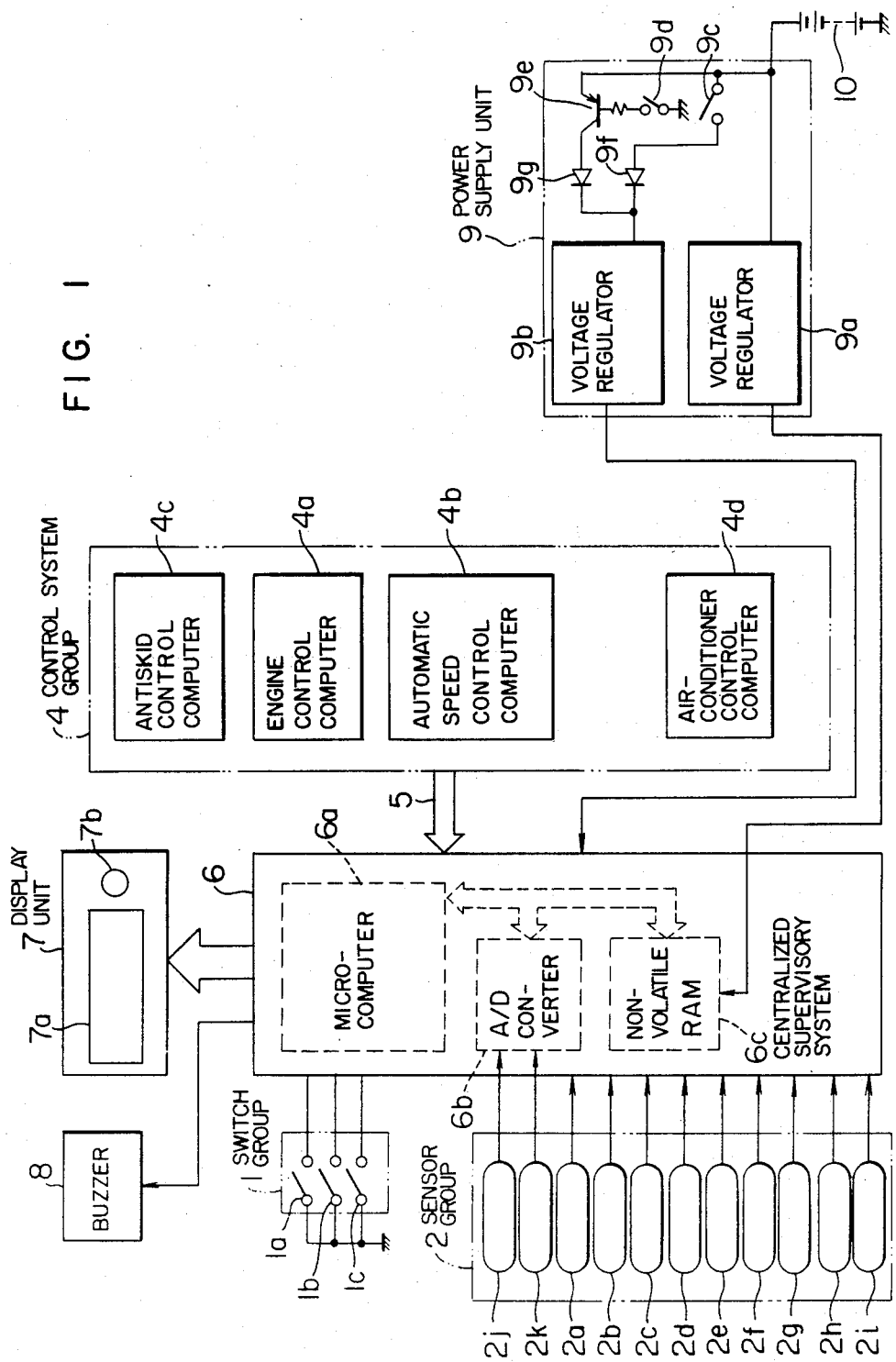
FIG. 1 is a block diagram showing the overall construction of an embodiment of the present invention.

FIG. 1 is a block diagram showing the overall construction of the embodiment. In the Figure, numeral 1 designates a switch group, 1a a first diagnosis switch for applyign a command to a centralized supervisory system 6 such that first diagnosis data are selected and displayed as the contents to be displayed on a display unit 7 in preference to other display contents, and 1b a second diagnosis switch for applying a command to the centralized supervisory system 6 such that second diagnosis data are selected and displayed as the contents to be displayed on the display unit 7 in preference to the other display contents. The first and second diagnosis switches 1a and 1b form command generating means. While the contents of the first and second diagnosis data will be described later, in the case of the ordinary vehicle the second diagnosis switch is a concealed switch which is not readily operable by the driver and usually it is used only when the vehicle is brought to a service shop or the like having the necessary facilities for servicing and repairing purposes and repairs, inspections, etc., are effected. Numeral 1c designates an initial setting switch (IS switch) for applying to the centralized supervisory system 6 a command for initializing the diagnosis data stored in a nonvolatile RAM 6c which is a principal component part of the centralized supervisory system 6. Numeral 2 designates a detector group comprising a cooling water level warning switch 2a, a window washer liquid level warning switch 2b, a head lamp failure detecting circuit 2c, a rear lamp failure detecting circuit 2d, a stop lamp failure detecting circuit 2e, an unlocked steering switch 2f, an open door switch 2f, a closed ignition switch 2h, a lighting switch 2i, a battery voltage dividing circuit 2j, a vehicle compartment temperature sensor 2k (a thermistor or the like), etc., which are mounted at various parts of the vehicle, whereby the conditions of these vehicle parts are monitored and these conditions are converted to analog or digital electric signals in response to changes in the conditions, thereby supplying the resulting condition data to the centralized supervisory system 6.

Numeral 4 designates a vehicle-mounted control syststem group comprising an engine control computer 4a, a vehicle speed control computer 4b (including a vehicle speed warning control unit), an antiskid control computer 4c, an air-conditioner control computer 4d, etc. Although not shown, connected to each of the control computers are an actuator group and a sensor group which are required for accomplishing the purpose of the control computer, whereby various data are collected from the sensor group and the data are processed by a microcomputer which is a principal component part of the control computer and not shown, thereby controlling the actuator group in accordance with the results of the processing. Each of the control computers 4a, 4b, 4c and 4d holds its own diagnosis data and operating condition data produced in the course of its control in accordance with a diagnostic program forming a part of its control program and these data are transmitted to the centralized supervisory system 6 serially at suitable timings in accordance with a predetermined communication procedure via a data transmission line group 5 between the centralized supervisory system 6 and the control computer 4a, 4b, 4c and 4d.

For instance, connected to the engine control computer 4a is an engine operating condition sensor group (not shown) including a water temperature sensor (thermistor), an intake air temperature sensor (thermistor), an intake air flow sensor (potentiometer), a battery voltage sensor, an acceleration sensor, an oxygen sensor, an engine crank angle sensor, a vehicle speed sensor, an idle switch, a full throttle switch, a neutral position switch, etc., whereby the data from the sensor group are inputted and processed by a microcomputer which is a principal component part of the control system and not shown, thereby controlling the energization period and the timing of initiating energization of the drive coils of injectors or actuators (not shown) for injecting fuel into the engine intake system (not shown) so as to optimize the fuel supply to the engine for the purpose of purifying the exhaust gases, improving the drivability, improving the fuel consumption, increasing the power output and so on. Also, to attain the same purposes, the data from the sensors are processed so that in accordance with the results of the processing the timing of initiating and interrupting current flow in the ignition coil of the ignition system (not shown) so as to control the ignition timing of the ignition system and control the ignition capacity of the ignition system above a given level at all the engine speeds. Also, with a view to maintaining the engine speed at a given value during the idling operation of the engine, the control computer 4a controls the opening and closing of the intake valves effected by a step motor which is not shown and forming an actuator for feedback controlling the air flow to the engine in accordance with the engine speed. Further, the amount of air flow to the engine may be adjusted by an air switching valve (not shown) which subjects the energization period of a drive coil of a vacuum switching valve (not shown) to duty cycle control in a manner that a suitable vacuum is produced by mixing the engine intake vacuum and the atmospheric pressure with a duty cycle and the amount of air flow is controlled in accordance with the produced vacuum.

During the control of the engine overall control system 4a, the operating conditions of the sensors and actuators connected to the control system and the operating conditions of the circuits in the control system itself are diagnosed to determine whether they are functioning properly or malfunctioning and the resulting data are stored. In addition, in accordance with the data from the sensors the data of the operating conditions, such as, the engine speed are stored and these data are transmitted to the centralized supervisory system 6 serially at a suitable timing in accordance with the predetermined communication procedure via the data transmission line group 5.

Numeral 5 designates the data communication line group connecting the centralized supervisory system 6 to the vehicle-mounted control system group 4. The centalized supervisory system 6 comprises a single-chip microcomputer 6a including a CPU, an ROM, an RAM, an I/O circuit section, etc., an A/D converter 6b and a CMOS nonvolatile RAM 6c as its principal component parts, whereby the control command data applied from the switch group 1 to the centralized supervisory system 6 are inputted through the input ports of the microcomputer 6a, the data indicative of the conditions at the various vehicle parts where the detectors are mounted are inputted and the serial data transmitted from the vehicle-mounted control system group 4 are received. These data are processed by the microcomputer 6a so that various display data are produced and stored in the ROMs. Of the various display data thus stored the data to be displayed are selected and the display unit 7 is controlled to display the selected data. Note that of the display data stored in the RAMs, those which are important are stored in the nonvolatile RAM 6c whose stored contents are not erased even if the power supply is disconnected.

The stored contents of the nonvolatile memory 6c are as shown in the following Table 1, that is, the diagnosis malfunction data sent from the control computers 4a, 4b, 4c and 4d and the diagnosis malfunction data of the centralized supervisory system 6 itself are mainly stored in the area A of the nonvolatile RAM 6c and its area B stores other data such as the OK monitor data, the switch data, the operation data of the control computers 4a, 4b, 4c and 4d, the battery voltage, compartment temperature and other data and the temporary data generated in the course of the microcomputer processing.

TABLE 1

| A | B |
|---|---|
| Storage of diagnosis data | 1. Storage of other display data |
| o Diagnosis malfunctions flag 1 group | o OK monitor |
| Diagnosis malfunctions flag 2 group | o Switch data |
| | o Control system operation data |
| o Diagnosis malfunctions | o Compartment temperature, battery voltage |
| Post-reception elapsed time counter | 2. Temporary data during microcomputer processing |
| o Diagnosis warning lamp flag (flag A) | o Data communication receiving data |
| | o Display commands |
| | o Others |

In this case, it is possible to arrange so that the stored contents of the areas B are erased in response to the turning off of the ignition switch.

The A/D converter 6b receives and converts to digital form the analog voltages generated from the battery voltage dividing circuit 2j and the vehicle compartment temperature detecting circuit 2k (using a thermistor) in the detector group 2, and the converted digital data are supplied to the microcomputer 6a in response to the request therefrom.

The display unit 7 comprises a display 7a for displaying the characters and figures corresponding to the display commands from the centralized supervisory system 6 and a lamp or warning lamp 7b for giving a warning, and these characters and figures may for example be displayed by means of a cathode ray tube display, electro-luminescence (EL) display, liquid crystal (LC) display, gas discharge (GC) display, fluoluminescent display tube display or light-emitting diode (LED) display. Also, the lamp 7b may be comprised of an LED, incandescent lamp, gas discharge lamp or the like. Numeral 8 designates a buzzer which is turned on and off by a buzzer actuation signal from the centralized supervisory system 6 (a buzzer actuation transistor is included in the output stage of the centralized supervisory system 6) to give a warning to the driver.

Numeral 9 designates a power supply unit for the centralized supervisory system 6, which is supplied with a dc power from a battery 10 to generate constant voltages. Numerals 9a and 9b designate voltage regulators for generating constant voltages (each of which is a constant voltage of 5 V) from the voltage of the vehicle battery 10. The first voltage regulator 9a is directly connected to the vehicle battery so that the constant voltage is always supplied to the nonvolatile RAM 6c in the centralized supervisory system 6 and the nonvolatile RAM 6c is always supplied with current. Thus, the RAM 6c maintains its stored contents even if an ignition switch 9c is turned off. On the other hand, when the ignition switch 9c is turned on, the second voltage regulator 9b is supplied with the power from the battery 10 through the ignition key 9c and a diode 9f and it supplies the constant voltage to the component parts of the centralized supervisory system 6 other than the nonvolatile RAM 6c. Also, even with the ignition switch 9c turned off, if a door switch 9d is turned on (the switch is turned on when the driver's seat door is opened), a PNP transistor 9e is turned on and thus the second voltage regulator circuit 9b is brought into operation by the power supplied from the battery 10 through the PNP transistor 9c and a diode 9g.

Figure 10:
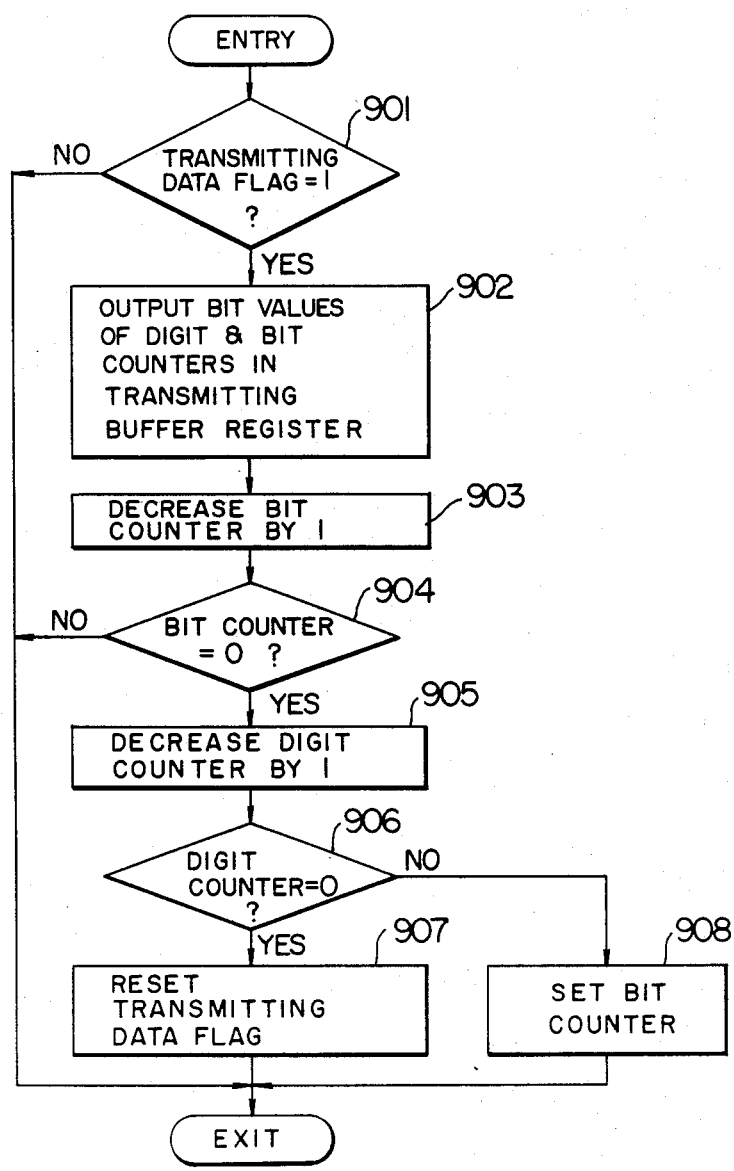
Figure 11:
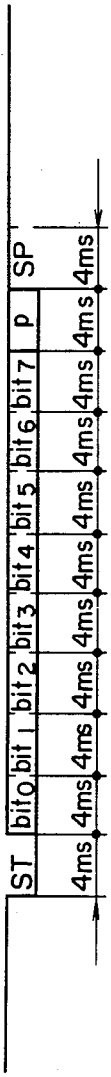
FIG. 11 is a diagram showing the format of a serial receiving data.

With the construction described above, the operation of the embodiment will now be described with reference to the display diagram shown in FIG. 2, the operational flow charts shown in FIGS. 3 to 10, the timing charts shown in FIGS. 12 to 14 and the serial data format diagrams shown in FIGS. 11 and 15.

Now, in the vehicle equipped with the component units 1 to 10 of FIG. 1, when the key switch 9c is turned on or the driver's seat door is opened even if the key switch 9c is off at the start of the driving, the constant voltage is supplied from the battery 10 through the second voltage regulator 9b and the various electric systems are brought into operation. Thus, the microcomputer 6a comes into operation in response to the application of the stabilized voltage from the second voltage regulator 9b and thus the processing steps of the control program are executed at intervals of about several hundreds m sec.

Figure 3:
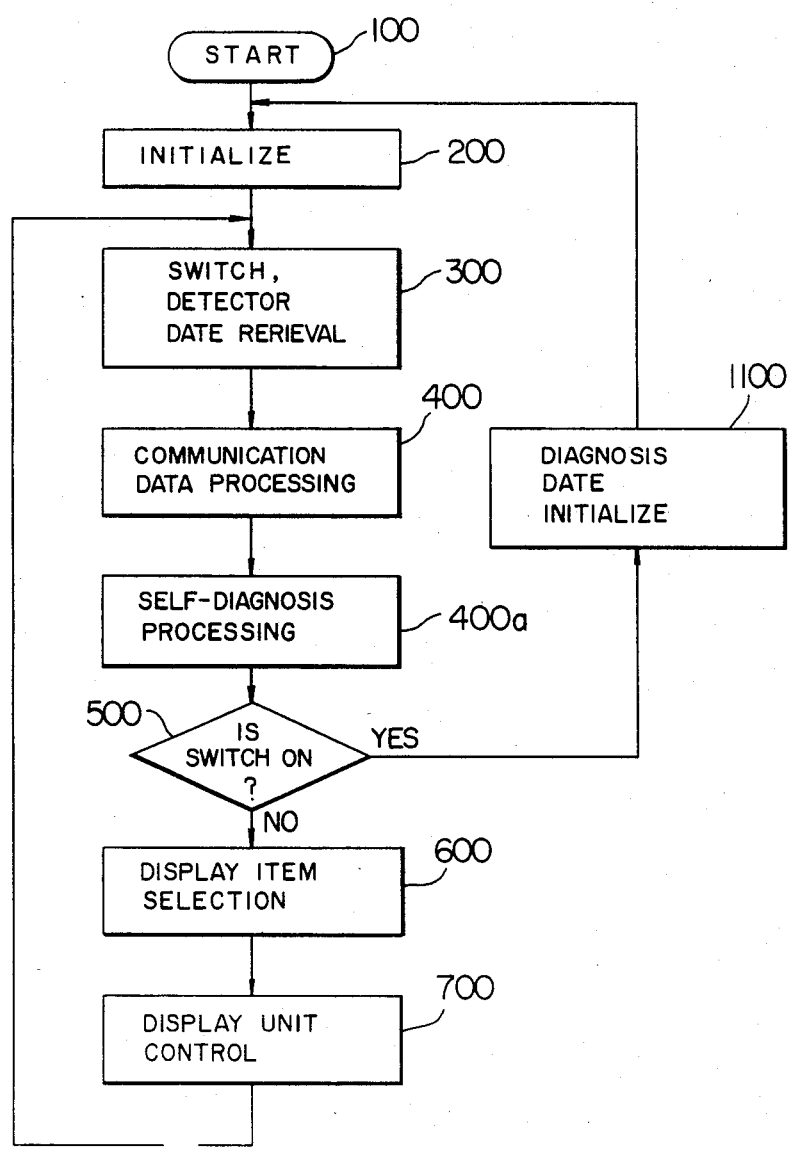

More specifically, the processing is started by a start step 100 of FIG. 3 and the processing proceeds to an initialization routine 200 thereby setting the registers, counters and latches in the microcomputer 6a and some of the stored contents of the RAM to the necessary initial states for commencing the processing. This initialization operation includes the resetting of monitor flags for the respective items of the OK monitor, the initialization of a serial data reception routine, the operation of initializing the operation data of the control computers, 4a, 4b, 4c and 4d, etc., which will be described later. However, the diagnosis data of the control computers 4a, 4b, 4c and 4d which have been stored by that time are not subjected to the effect of the initialization operation.

Also, the method of simultaneously checking the check code data in the check code area of the nonvolatile RAM 6c (the data indicative of the validity of the data written in the nonvolatile RAM 6c just prior to the preceding turning off of the ignition switch 9c if the nonvolatile RAM 6c has been continuously supplied with the constant voltage since the preceding turning on of the ignition switch 9c) and the other data in the nonvolatile RAM 6c is effected so that if the result of the check differs from a predicted value, it is determined that the ignition switch 9c is turned on for the first time and the constant voltage is supplied to the whole centralized supervisory system 6 after the constant voltage has been supplied to the nonvolatile RAM 6c and it is also determined that all the data in the nonvolatile RAM 6c are invalid thereby initializing the data.

After the initialization, a transfer is made to a data retrieval (switch group and detector group) routine 300. The data retrieval routine 300 sets or resets first and second diagnosis switch flags and an IS switch flag in correspondence to the on or off state of the first and second diagnosis switches 1a and 1b and the IS switch 1c. Also, the on or off state of the cooling water level warning switch 2a and the window washer liquid level warning switch 2b in the detector group 2 are detected to determine whether the cooling water and window washer liquid levels are below normal and a deficient cooling water flag and a deficient window washer liquid flag are reset or set correspondingly. The high or low level of the output voltages of the head lamp failure detecting circuit 2c, the rear lamp failure detecting circuit 2d and the stop lamp failure detecting circuit 2e are detected to determine whether the head lamps, rear lamps and stop lamps are functioning properly or not and the associated lamp failure flags are set or reset correspondingly. Also, the on or off state of the closed ignition switch 2h, the lighting switch 2i and the open door switch 2g are detected to determine the establishment of three conditions that the closed ignition switch 2h is off (open), that the lighting switch 2i is on and that the open door switch 2g is on (open) and then a "light-left-on" flag is set for a predetermined time after the estabilishment of the conditions. Also, the on or off state of the closed ignition switch 2h, the unlocked steering switch 2f and the open door switch 2g are detected to determine the establishment of conditions that the closed ignition swtich 2h is off, that the unlocked steering swtich 2f is on (the condition of the key being inserted) and that the open door switch 2g is on and then a "key-left-inserted" flag is set for a predetermined time after the establishment of the conditions. Also, battery voltage and vehicle comopartment temperature data are obtained in accordance with the digital signals produced by the A/D converter 6b from the output voltages of the battery voltage dividing circuit 2j and the vehicle compartment temperature detecting circuit 2k and the data are stored in the RAM. After the completion of these processing operations, a transfer is made to a communication data processing routine 400.

Figures 2, 4:
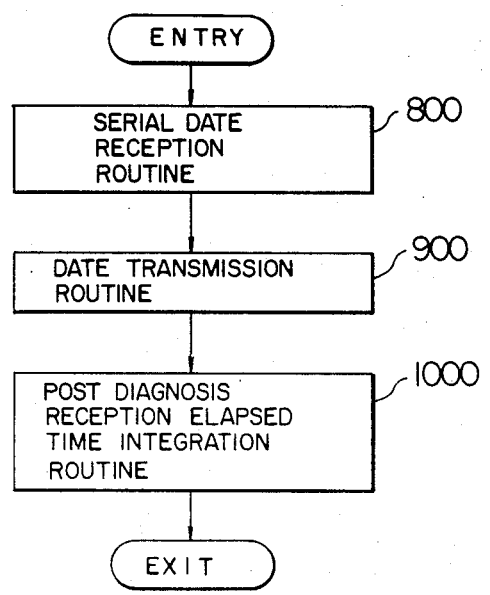
FIG. 2 shows a plurality of displays useful for explaining the operation of the embodiment of FIG. 1.
FIGS. 3 to 10 are operational flow charts showing the processing steps executed by the microcomputer of FIG. 1 in accordance with control programs.
Figure 6:
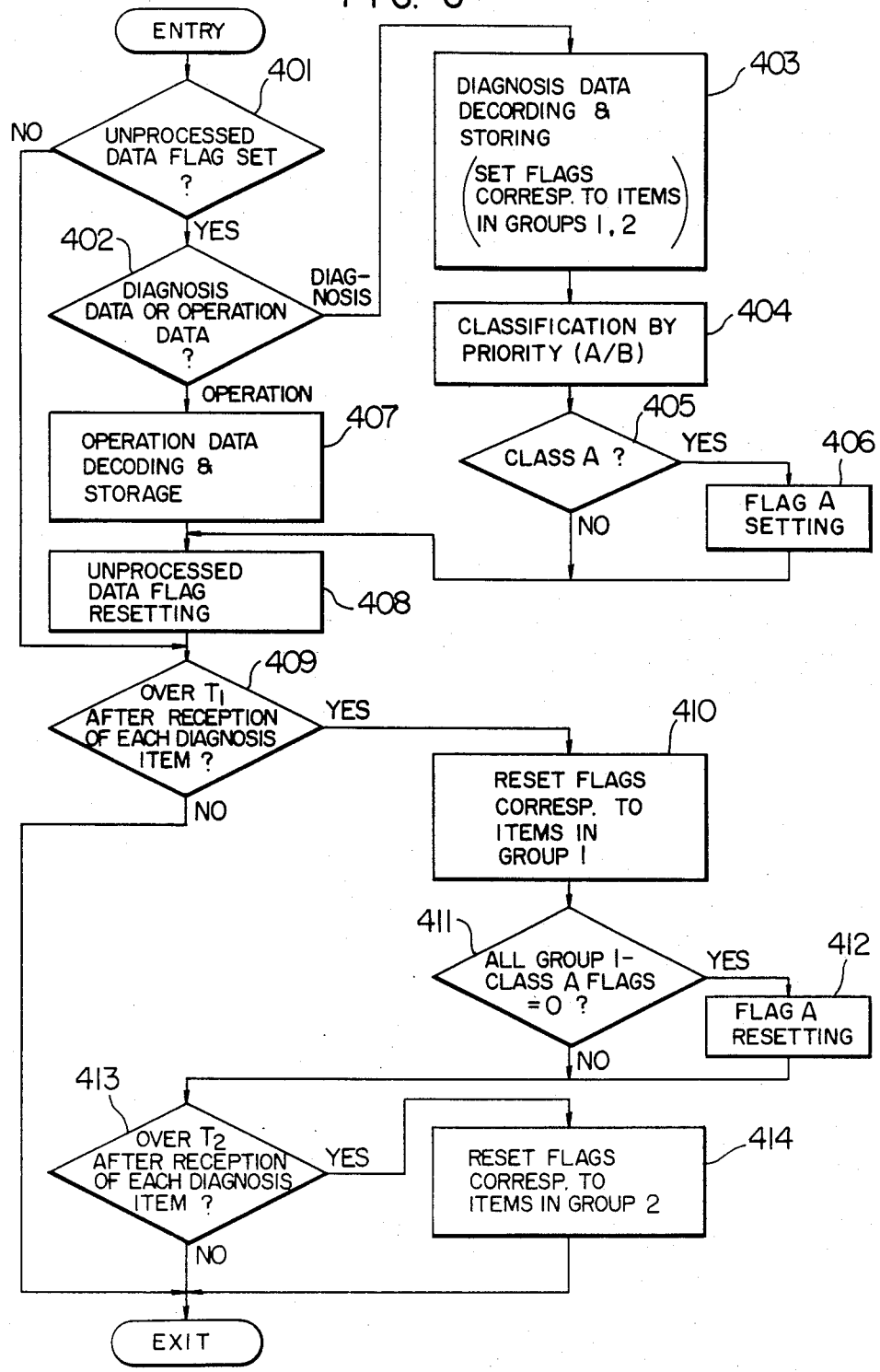
Figure 7:
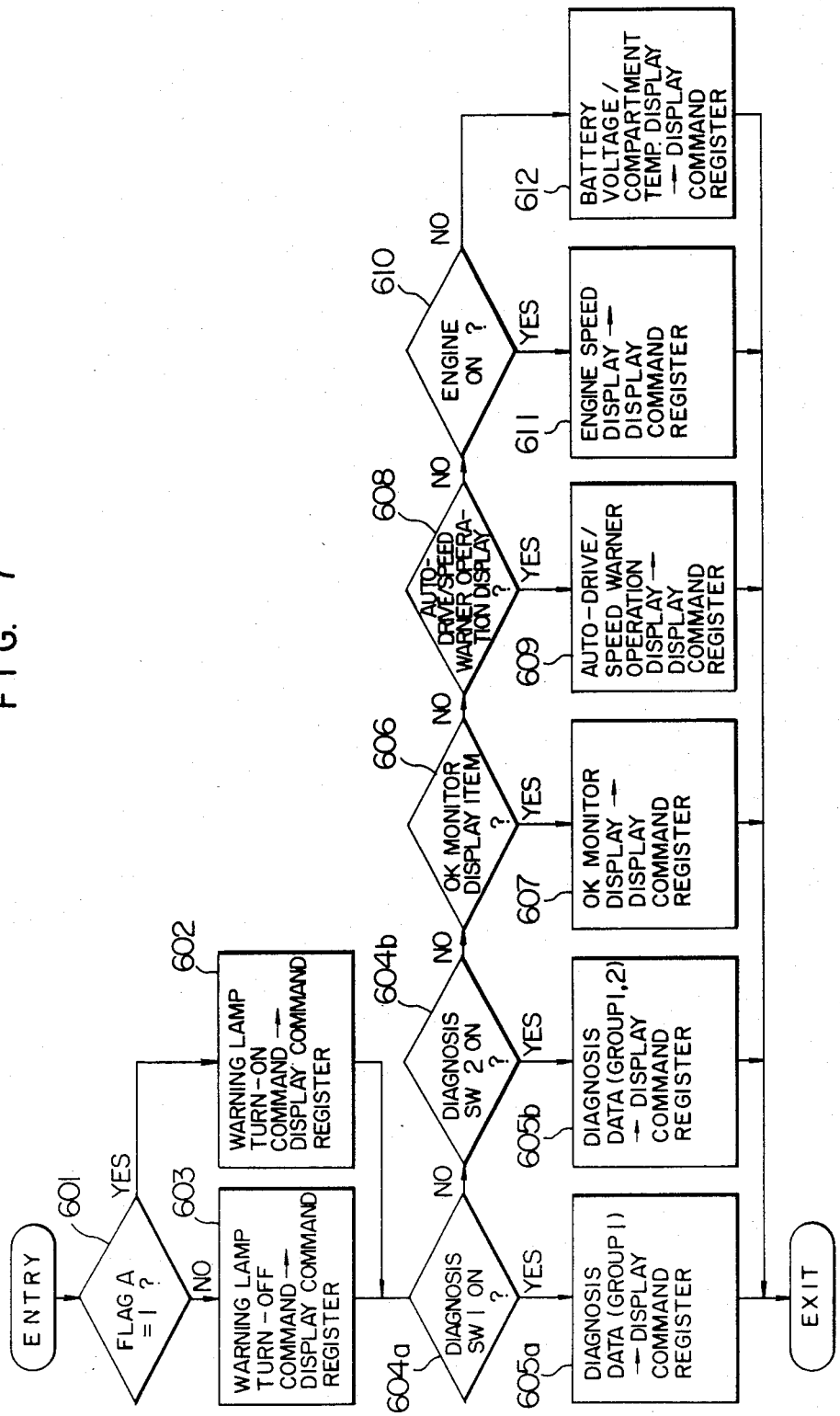

The communication data processing routine 400 decodes the data received from the control system group 4 in accordance with the timer interrupt routine shown in FIG. 4 so that the diagnosis data and the operating condition data of the control computers 4a, 4b, 4c and 4d are obtained and the necessary data processing is performed for the operation display and diagnosis display of the control computers 4a, 4b, 4c and 4d on the basis of these data. (The detailed processing steps are shown in FIG. 6.)

The receiving data used by the communication data processing routine 400 will now be described. Now, with the series of routines shown in FIG. 3 being executed, if a transfer is made to a serial data reception routine 800 in the timer interrupt routine of FIG. 4 which is executed in preference to the other routines by a timer interrupt effected at predetermined intervals of 1 m sec, the diagnosis data and operating condition data of the control computers 4a, 4b, 4c and 4d transmitted from the control system group 4 through the data communication line group 5 in accordance with the predetermined communication procedure are sampled at a suitable timing synchronized with the timer interrupt and the necessary processing steps such as a parity error check are performed to confirm the validity of the data. If the validity of the data is determined, the data are stored in the nonvolatile RAM 6c through the associated communication lines and simultaneously unprocessed data flags of the communication lines are set. The format of such serial data is shown in FIG. 11. Next, the operation of the serial data reception routine 800 will be described with reference to the serial data reception timing chart shown in FIG. 12. In the Figure, shown in (a) is the timing of occurrence of the timer interrupt. Shown in (b) and (f) are the serial data from the two data communication lines (hereinafter referred to as first and second data communication lines) in the data communication line group 5. Shown in (c) and (g) are the data sampling timings of the first and second data communication lines. Shown in (d) and (h) are the reset/set timings of data reception flags indicating that the serial data of the first and second data communication lines are being received. Shown in (e) and (i) are the timings of setting, in correspondence to the first and second data communication lines, the unprocessed data flags indicating that the data received from the communication lines have not been processed by the communication data in the main routine. The transmission rate of the serial data is 250 bits per second and the serial data comprises, as shown in FIG. 11, one low-level start bit (ST), eight positive logic data bits, one even parity bit (p) and one high-level stop bit. The level goes to high when there is no data.

Figure 5:
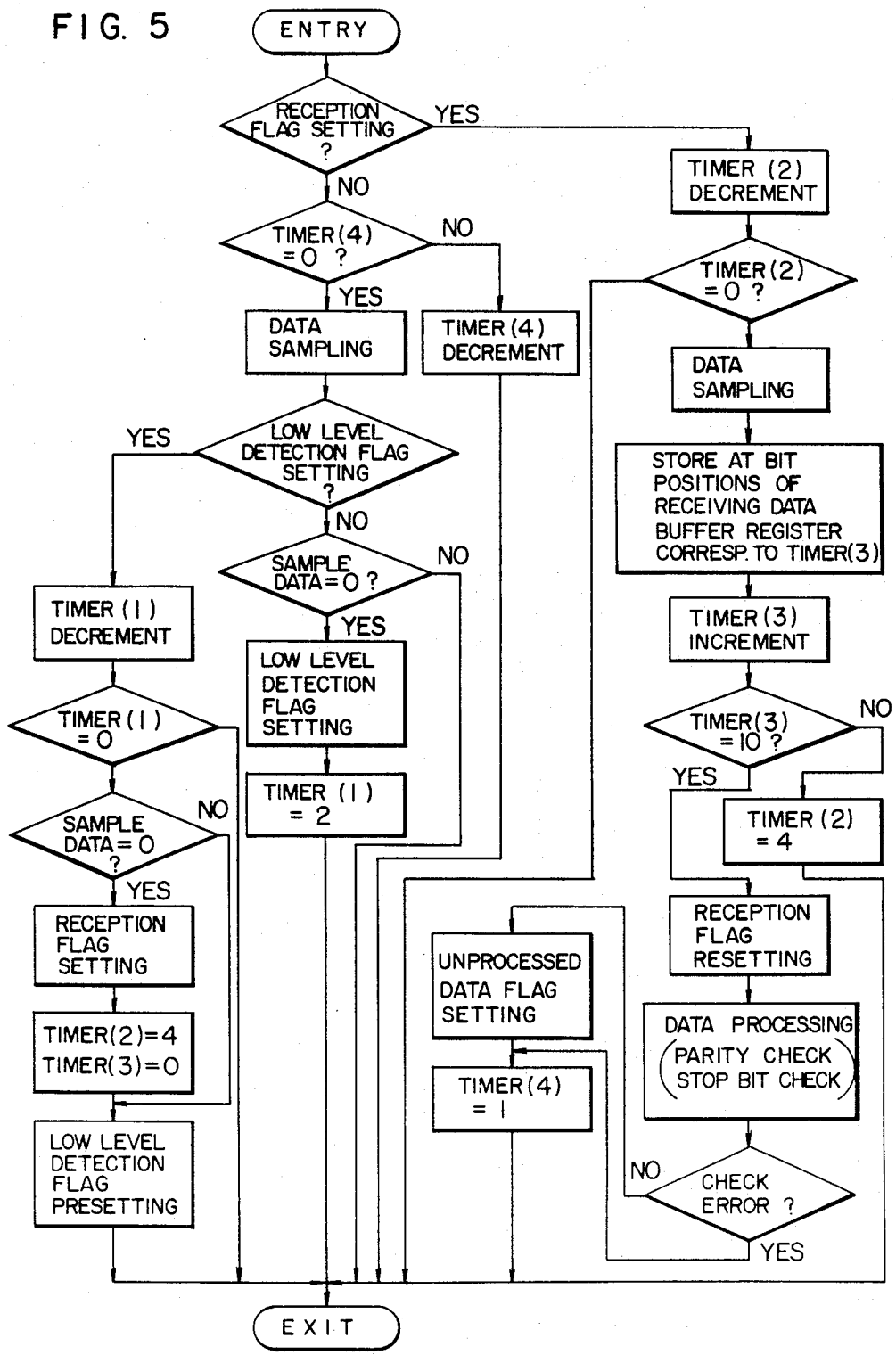

Next, the operation of the serial data reception routine 800 will be described with reference to the timing chart of FIG. 12 and the detailed processing steps of FIG. 5. The processing steps of FIG. 5 correspond to one serial receiving data and the similar processing steps are successively executed with respect to the other serial receiving data.

Figure 12:
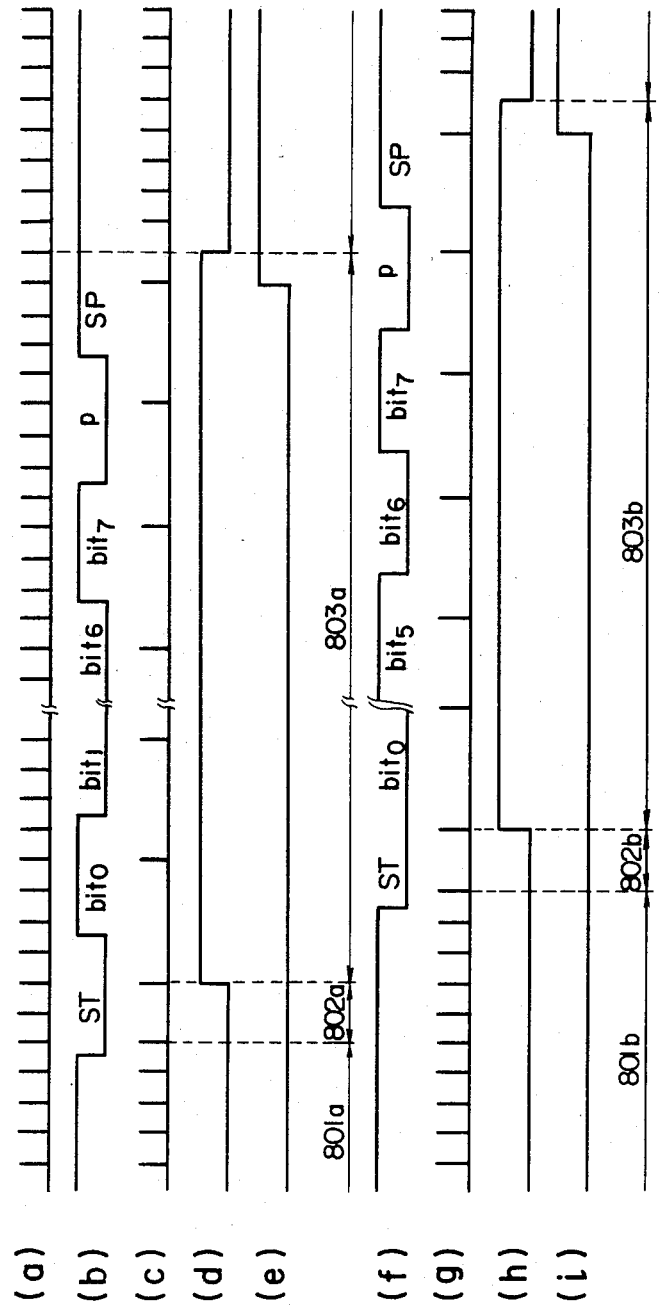

In the previously described timing chart, the data on the first and second data communication lines ((b) and (f) of FIG. 12) are sampled at the data sampling timings ((c) and (g) of FIG. 12) in synchronism with the timer interrupt generation timing ((a) of FIG. 12). Intervals 801a and 801b indicate start bit detecting intervals in which a non-data state is continuing in each data communication line after the completion of one data transmission and the data on each data communication line is sampled each time the timer interrupt is generated (at intervals of 1 m sec). This interval is one in which the timing of the first transition to the low level is detected after the completion of the preceding data communcation and the resulting transition of the data transmission line to the high level state. The following intervals 802a and 802b are start bit confirming intervals in which the data on each data communication line is sampled in synchronism with the timing of the second timer interrupt (after 2 m sec) after the detection of the transition of the data communication line from the high to the low level and the presence of a true start bit (ST) is determined if the low level is still present. If the sampled value is the high level, it is determined that the previously sampled low level is noise and the conditions of the intervals 802a and 802b are restored. During the following serial data reception intervals 803a and 803b after the intervals 802a and 802b, in response to every fourth (4 m sec) timer interrupt occurrence timing after the preceding data sampling the data on the first and second data communication lines are sampled with respect to the bits in the communication data (eight data bits + one parity bit + one stop bit = ten bits). A check of the relation between the eight data bits and the parity bit in the thus obtained ten bits (a parity check) and a check of the level of the stop bit (high level) are performed so that if the completion of the proper reception is determined, the eight data bits are stored in the RAM and simultaneously the unprocessed data flags corresponding to the data communications lines are set at the timings shown in (e) and (i) of FIG. 12. Note that as shown in (d) and (h) of FIG. 12, the data reception flags are set for the interval between the time that the start bit is confirmed and the time that the first timer interrupt is generated after the sampling of the stop bit and during the intervals the data are unconditionally sampled in response to every fourth timer interrupt, thereby handling the resulting data as the communication data.

In accordance with the above-mentioned receiving data and the unprocessed data flags, the communication data processing routine 400 first proceeds to an unprocessed data flag decision step 401 of FIG. 6. Here, the set/reset condition of the above-mentioned unprocessed data flag of each communication line is determined. If the unprocessed data flag is set so that the decision becomes YES, a transfer is made to the next diagnosis or operation condition data decision step 402. In accordance with a predetermined classification, the decision step 402 classifies the data on the different communication lines or on the same communication line into the diagnosis and operating condition data according to the form of the data. Thus, if the data are the diagnosis data, a transfer is made to a diagnosis data decoding and storage routine 403. If the data are the operating condition data, a transfer is made to an operating condition data decoding and storage routine 407. When a transfer is made to the routine 407, the receiving data are decoded so that the data are stored as engine speed, automatic drive operating condition, speed warner operating condition and other condition data in the RAM and then a transfer is made to the next step 408. When a transfer is made to the routine 403, the receiving data are decoded as the diagnosis malfunction data and classified according to the control systems and the check items. Thus, as shown in Tables 2 and 3, the data are stored in the diagnosis data storage area of the non-volatile RAM 6c (Tables 2 and 3 show the groups 1 and 2 of these diagnosis malfunctions, with the group 1 corresponding to addresses $ADR_1$ to $ADR_{1+n}$ and the group 2 corresponding to addresses $ADR_2$ to $ADR_{2+n}$) and the corresponding diagnosis malfunction flags of the diagnosis malfunction flag groups (the I/O parts in the Tables) for the groups 1 and 2 according to the diagnosis malfunction items of the control systems are set (the I/O parts are set to 1). Then, the corresponding diagnosis counters are set to 0. Of the diagnosis counters, the contents of the diagnosis counters corresponding to the diagnosis malfunction flags which are set to 1 at intervals of given times (at intervals of 1 second for the group 1 and intervals of 1 hour for the group 2) synchronized with the timer interrupt in a post diagnosis malfunction reception elapsed time integration routine 1000 in the timer interruption routine of FIG. 4, are read into the microcomputer 6a and increased by one in the microcomputer 6a and the values are again written into the address counters where they were previously stored. In other words, the counters of the groups 1 and 2 corresponding to the diagnosis malfunction flags set to 1 are increased by one at intervals of 1 second for the group 1 and at intervals of 1 hour for the group 2. As a result, the two kinds of diagnosis counters respectively indicate the elapsed times since the last reception of the corresponding diagnosis malfunction items in terms of seconds and hours, respectively. In the Tables 2 and b 3, (1), (2), (3) and (4) respectively correspond, for example, to the No. 1 item of the engine ECU, the No. 2 item of the engine ECU, the No. 1 item of the air-conditioner ECU and the No. j item of the automatic drive ECU.

TABLE 2

| Address | Data | | |
|---|---|---|---|
| $ADR_{1+0}$ | 1/0 | Counter | (1) |
| $ADR_{1+1}$ | 1/0 | Counter | (2) |
| $ADR_{1+i}$ | 1/0 | Counter | (3) |
| $ADR_{1+n}$ | 1/0 | Counter | (4) |

TABLE 3

| Address | Data | | |
|---|---|---|---|
| $ADR_{2+0}$ | 1/0 | Counter | (1) |
| $ADR_{2+1}$ | 1/0 | Counter | (2) |
| $ADR_{2+i}$ | 1/0 | Counter | (3) |
| $ADR_{2+n}$ | 1/0 | Counter | (4) |

When the routine 403 is completed, a transfer is made to a priority classification routine 404. In the routine 404, the diagnosis receiving data processed by the routine 403 are classified into classes A and B according to predetermined priorities with respect to the diagnosis malfunction items and then a transfer is made to the next A/B decision step 405. If the data are the class A, a transfer is made to a flag A set routine 406. The routine 406 sets a flag A and transfers to the routine 408. On the other hand, if the A/B decision step 405 determines that the data are of the class B, the step 405 directly transfers to the routine 408. The unprocessed data flag reset routine 408 is a reset routine for the unprocessed data flags corresponding to the receiving data processed by the routines 403 and 407. After passing through the routine 408, a transfer is made to a post diagnosis reception elapsed time decision step 409. If the decision of the first unprocessed data flag decision step 401 is NO, the step 401 directly transfers to the decision step 409.

Then, the decision step 409 determines the elapsed time from the reception in terms of the timer counter value integrated by the routine 1000 of FIG. 4 for each of the diagnosis malfunction items in the group 1 of the Table 2, so that a transfer is made to a flag reset routine 410 when the elapsed time is greater than a first predetermined timing or given time $T_1$ (e.g., 15 seconds). If the elapsed time is less than the given time $T_1$, the step 409 directly transfers to a routine 400a of FIG. 3. When a transfer is made to the flag reset routine 410, it resets all the diagnosis malfunction flags of the group 1 which are determined by the decision step 409 as exceeding the given time $T_1$. Then, the next decision step 411 determines whether all the diagnosis malfunction flags of the class A in the group 1 have been reset. If they have been reset altogether, a transfer is made to a routine 412 thereby resetting the flag A set by the routine 406. If at least one of them is still in the set condition, the step 411 directly transfers to the next decision step 413. The decision step 413 determines the elapsed time from the reception in terms of the timer counter value integrated by the routine 1000 of FIG. 4 for each of the diagnosis malfunction items of the group 2 corresponding to the flags set. If the elapsed time is greater than a second predetermined timing or a given time $T_2$ (e.g., 20 hours), a transfer is made to a flag reset routine 414 for the group 2. If the elapsed time is less than the given time $T_2$, the step 413 directly transfers to the routine 400a of FIG. 3. When a transfer is made to the routine 414, it resets all the flags of the group 2 determined by the decision step 413 as exceeding the given time $T_2$ and the counting operation of the corresponding counters is disabled. Then, a transfer is made to the next routine 400a.

Then, the self-diagnosis processing routine 400a of FIG. 3 performs a self-diagnosis of the centralized supervisory system 6 in accordance with predetermined decision criteria. In other words, the routine 400a checks the level of the input signal lines to the centralized supervisory system 6 under predetermined conditions, the presence or absence of the input signals in a given time period, etc., by means of the microcomputer 6a of the centralized supervisory system 6. If the results do not meet the criteria, it is determined that there exist malfunctions in some parts of the input systems for the input signals and the results are stored as diagnosis malfunction data in the nonvolatile RAM 6c in the like manner as the diagnosis malfunction data transmitted from the control computers 4a, 4b, 4c and 4d. In addition, the self-diagnosis may include the diagnosis of the output signals through the monitoring thereof by a separate circuit, the checking of the program ROM depending on the type of the microcomputer used and the checking of the RAM upon connection to the power source. After the completion of the routine 400a, a transfer is made to a decision step 500.

The decision step 500 determines the data of the IS switch IC inputted by the routine 300 in accordance with an IS switch flag. If the IS switch flag is set, then the processing returns to the initialization routine 200 through a diagnosis data initialization routine 1100. If the flag is reset, a transfer is made to the next display item selection routine 600. When a transfer is made to the routine 1100, all the malfunction flags of the diagnosis malfunction data in the groups 1 and 2 are reset and also the flag A is reset.

When a transfer is made to the display item selection routine 600, in accordance with the data inputted by the routines 300 and 400 the items to be displayed on the display unit 7 are selected in accordance with predetermined display priorities and then the contents of the selected items are set in a display command register adapted to store display commands to the display unit 7. The display commands include a warning lamp lighting command and a buzzer actuation command and they may be applied along with the display commands for the selected display items. The display item selection routine 600 will now be described with reference to the detailed flow chart of FIG. 7.

Figure 8:
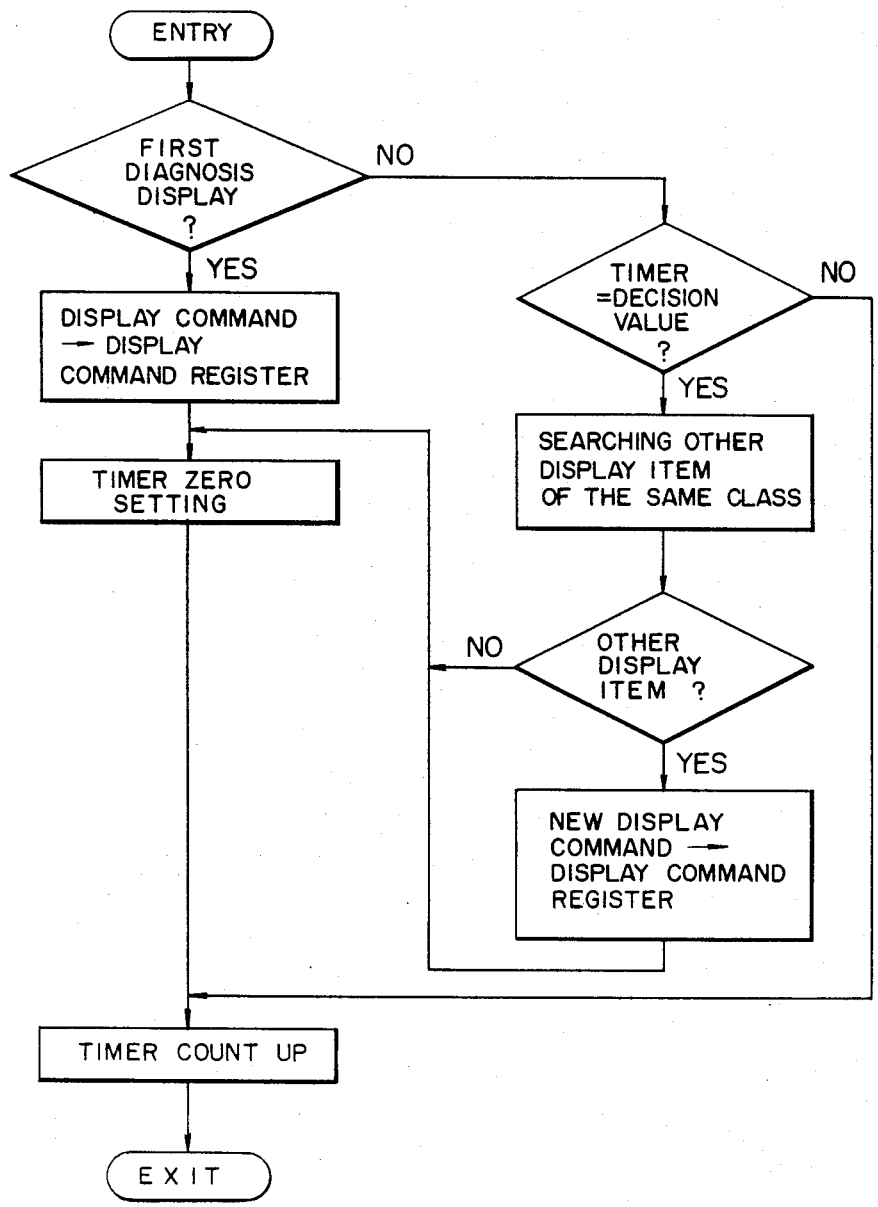
Figure 9:
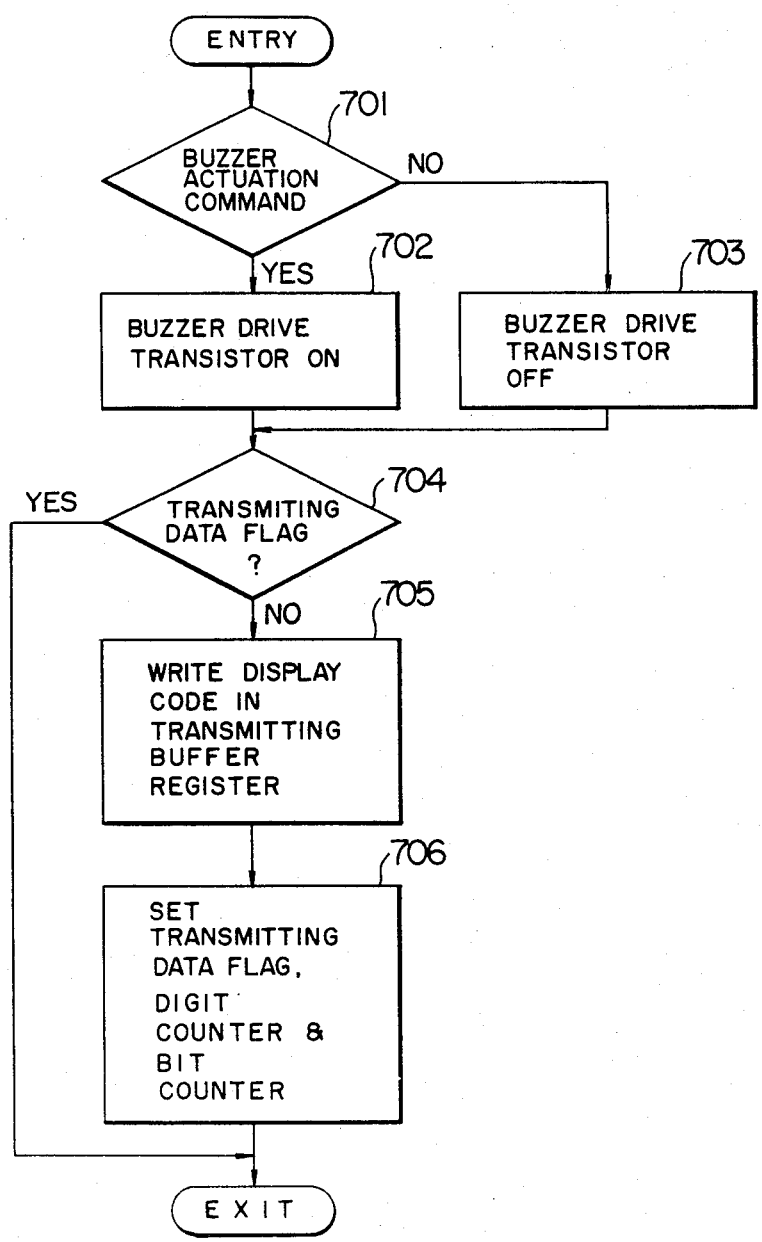

When the processing proceeds to the display item selection routine 600, a transfer is made first to a step 601 for determining the value of the flag A and the flag A which is set and reset by the routines 406 and 412 is now checked. If the flag A is in the set state, it is determined that any diagnosis malfunction of a high priority is presently occurring in some of the control systems and a transfer is made to a warning lamp lighting command routine 602, thereby setting in the display command register a warning lamp lighting command for operating the warning lamp and alerting the driver to make the necessary repair as soon as possible. If the check of the flag A shows that the flag A is in the reset state, it is determined that presently there is no occurrence of any diagnosis malfunction of a high priority in any part of the whole systems of the vehicle and a transfer is made to a warning lamp turn-off routine 603, setting a warning lamp turn-off command in the display command register. Then, in either case a transfer is made to the next decision step 604a for determining the first diagnosis switch flag. The decision step 604a determines the value of the first diagnosis switch flag which is set or reset by the previously mentioned routine 300, so that if the flag is in the set state, the occurrence of a display request for the first diagnosis data is determined and a transfer is made to a first diagnosis display command routine 605a. This routine 605a sets in the display command register the display commands corresponding to combination displays of control system discriminating codes and diagnosis malfunction content discriminating item codes for the control computers 4a, 4b, 4c and 4d, such as, shown in (a), (b) and (c) of FIG. 2 to provide displays on the display unit 7. The control system discriminating codes include E/G (engine controller), A/C (air-conditioner controller) and ESC (skid controller) shown in (a), (b) and (c) of FIG. 2 and A/D (automatic drive controller), etc., which are not shown. The diagnosis malfunction item classification codes for each of the control computers 4a, 4b, 4c and 4d are represented in the form of Arabic numerals such as "01", "02" and "11". The detailed processing steps of the first diagnosis display command routine 605a are shown in FIG. 8. With the thus described operation, if a plurality of diagnosis malfunctions are present, the corresponding display commands are cyclically replaced in order of the increasing address numbers in the group 1 or the predetermined priorities at intervals of a given time period (e.g., two seconds). Where there is no diagnosis malfunction item to be displayed for the group 1, a word "OK" is simply used thereby indicating that there is no malfunction.

On the other hand, if the decision of the decision step 604a is NO, a transfer is made to the next decision step 604b for determining the second diagnosis switch flag. The decision step 604b determines the value of the second diagnosis switch flag which is set or reset by the routine 300 so that if the flag is in the set state, the occurrence of a display request for the first and second diagnosis data (the groups 1 and 2) is determined and the step 604b transfers to a second diagnosis display command routine 605b. The diagnosis display command routine 605b sets in the display command register the display commands corresponding to the combination displays comprising the control system discriminating codes and the diagnosis malfunction content discriminating item codes of the control computers 4a, 4b, 4c and 4d as shown in (a), (b) and (c) of FIG. 2 thereby causing the display unit 7 to display the desired displays. Also, it is determined that any malfunction is still present with respect to the item of the groups 1 and 2 corresponding to the flag in the set state and a warning lamp lighting command is also set in the display command register such that the lamp 7a forming a warning lamp is turned on simultaneously with the display of the diagnosis malfunction item. In this way a distinction is drawn between the malfunctions which is still present and that which is a past event. Also in this case, if a plurality of diagnosis malfunctions are present, the corresponding displays are cyclically written at intervals of a given time period (e.g., 2 seconds) in the like manner as the processing of the first diagnosis display command routine 605a. As a result, if the user is provided with a chart showing the correspondence between the diagnosis malfunction item codes and the malfunction contents, he can understand the diagnosis malfunction contents and use the same as a source of information for repairing the troubles. In determining the malfunction codes, it is desirable to use the same codes with respect to the same malfunction contents even in cases of different types of vehicles and also, depending on the malfunction contents, it is desirable to divide the malfunction contents into some groups and assign the codes correspondingly. Then, if the decision of the second diagnosis switch flag decision step 604b is NO, a transfer is made to the next decision step 606 for determining whether there is any OK monitor display item having a lower display priority.

The decision step 606 determines all the values of the flag group corresponding to the OK monitor items and set or reset by the data retrieval routine 300, so that if at least one of the flags is in the set state, it is determined that there is an OK monitor display item and a transfer is made to an OK monitor display command routine 607. In accordance with the OK monitor malfunction flags set by the data retrieval routine 300 the OK monitor display command routine 607 sets in the display command register the display command corresponding to the malfunction contents to be displayed such that the malfunction contents against which the driver must be warned by the OK monitor are displayed in the form of words comprising alphabetic characters as shown in (e), (f), (g), (h) or (i) of FIG. 2. Note that when the display command for "IG KEY" representing the key which is left inserted or "LIGHT SW" representing the lights left on is set in the display command register, the buzzer actuation command is simultaneously set in the register. The display commands for "IG KEY" and "LIGHT SW" and the buzzer actuation command are each set in the display command register for a given time period (e.g., 10 seconds). Since these two items give warning when the driver turns off the ignition key switch 9c and opens the door to get off the vehicle, the buzzer is used simultaneously to increasingly call the driver's attention. Also, where a plurality of the OK monitor items are to be displayed, the corresponding display commands are cyclically replaced at intervals of a given time period (e.g., 5 seconds) as is the case with the processing of the first diagnosis display command routine 605a. If the decision step 606 determines that there is no OK monitor item to be displayed, it transfers to a decision step 608 for determining the presence of the auto-drive control and speed warner operation displays of the next lower display priority.

The decision step 608 determines the operaion data of the auto-drive control and the speed warner which were processed by the communication data processing routine 400, so that if there is any data indicating that either one of them is in operation, a transfer is made to an automatic drive/speed warner operation display command routine 609. In order to provide a display corresponding to the operating condition of either one of the auto-drive control and the speed warner which is determined as presently in operation, the operation display command routine 609 sets in the display command register the display command corresponding to the desired display as shown in (j), (k), (l) or (m) of FIG. 2. Of these exemplary displays, "AUTO DRIVE" is an operation display indicating that the automatic vehicle speed control is in operation and "A/D 100 KM" indicates an operating condition where the automatic vehicle speed control is being cancelled but the set vehicle speed has already been established and thus the depression of the resume switch (not shown) resumes the control to attain the automatic operation at the set speed of 100 KM/h. Also, "A/D MAIN" represents an operating condition where simply the main power source of the automatic vehicle speed control system 4b is on. "S/W 60 KM" represents an operating condition where the vehicle speed warning device is in operation so that a warning lower limit vehicle speed is set at 60 KM/h and presently the vehicle is running at a speed below the set speed. If this display flashes on and off, it is an indication that the current running vehicle speed is above the set speed and the flashing alerts the driver to it. (The details of this function will not be described.) If the decision step 608 determines that the auto-drive control and the speed warner are not in operation, it transfers to a decision step 610 for determining whether the engine speed of the next lower display priority is to be displayed.

The decision step 610 determines whether the engine is in operation in accordance with the engine speed data processed by the communication data processing routine 400. If the operation of the engine is determined, a transfer is made to an engine speed display command routine 611 so that the display command corresponding to a display of the engine speed processed by the routine 400 such as shown in (n) of FIG. 2 is set in the display command register. On the contrary, if the decision routine 610 determines that the engine is out of operation, it transfers to a routine 612 for commanding the display of the battery voltage or the vehicle compartment temperature of the lowest display priority.

Thus, with the display command routine 612, in order to display the battery voltage or vehicle compartment temperature data inputted by the data retrieval routine 300 as shown in (O) or (P) of FIG. 2, the display command corresponding to the desired display is set in the display command register. After the execution of its routine, each of the above-described display command routines 605a, 605b, 607, 609, 611 and 612 transfers to the next display control routine 700 of FIG. 3.

In response to the display commands set in the display command register by the above-described display item selection routine 600, the display control routine 700 sends the corresponding character display and warning lamp lighting commands to the display unit 7 and it also sends a buzzer actuation signal to the buzzer 8. The processing steps of the routine 700 will now be described with reference to the detailed operational flow chart shown in FIG. 9. When a transfer is made to the routine 700, the processing proceeds to a buzzer actuation command decision step 701 and a buzzer actuation command flag in the display command register is checked. If the flag is set, then the step 701 transfers to a routine 702 for turning on a buzzer drive transistor. If the buzzer actuation command flag is reset, a transfer is made to a routine 703 for turning off the buzzer drive transistor. The routine 702 or 703 is followed by a transmitting data flag decision step 704. The transmitting data flag is a flag for indicating that the transmission to the display unit 7 of the data in a serial data transmission buffer is not completed. If the flag is set, the processing of the routine 700 is completed without performing any further operation. On the contrary, if the transmitting data flag is reset, a transfer is made to a routine 705 so that in accordance with the character display and warning lamp turn on/turn off commands in the display command register, a character code string corresponding to the character string to be displayed (e.g., for the display of "HEAD LAMP" an 8-bit character code is provided for each of the characters) and a single-digit data code for commanding the flashing of the display and the turn on/turn off of the warning lamp are written into the transmitting buffer register. The following routine 706 sets the transmitting data flag and it also sets each of the digit counter and the bit counter used in a transmission routine 900 to a predetermined value (the digit counter and the bit counter are each set to 11). Thus, the processing of the routine 700 is completed and then a return is made to the data retrieval routine 300 in accordance with the flow chart of FIG. 3.

Next, the data transmission routine 900 in the interrupt routine of FIG. 4 will be described with reference to the detailed operational flow chart of FIG. 10, the serial data transmission timing charts of FIGS. 13 and 14 and the serial transmitting data format diagram of FIG. 15. In FIG. 13, shown in (a) is a transmitting data block timing chart showing the timing of serially transmitting an STX (start of text) code, N character codes including data 1 to data N (one of which is a display flashing and warning lamp turn-on/turn-off command data code) and an ETX (end of text) code in this order. Shown in (b) of the Figure is a transmitting data flag and the transmission of the STX code begins in response to the occurrence of the first timer interrupt after the setting of this flag. The transmitting data flag is reset upon completion of the transmission of the ETX code. Shown in (a), (b), (c), (d) and (e) of FIG. 14 is the data transmission timing of FIG. 13 in enlarged form (the timing for one digit of transmitting data), and (a) shows the timing of occurrence of the timer interrupt at intervals of 1 m sec. Shown in (b) is the transmitting data. Shown in (c) is the timing of decreasing the digit counter by 1 and this timing will be described with reference to FIG. 10. Shown in (d) is the timing of decreasing the bit counter by 1 as will be described with reference to FIG. 10 and this timing is synchronized with the occurrence of the timer interrupt so far as the transmitting data flag remains in the set state. Shown in (e) is the timing of setting the bit counter as will be described with reference to FIG. 10 and this timing occurs when the transmission of the character code (including the header part) for one digit is completed and the digit counter is not zero yet.

FIG. 15 shows the format of one digit of transmitting data. The transmission rate of the serial transmitting data is 1000 bit/sec and it comprises a single start bit (low level), eight data bits (positive logic), a single parity bit and a single stop bit (high level). In FIG. 10, when a transfer is made to the data transmission routine 900, the processing proceeds to a transmitting data flag decision step 901 and the value of the transmitting data flag is determined. If the flag is reset, the processing of the routine 900 is completed without performing any operation. If the flag is set, it is determined that there is a display data to be transmitted and a transfer is made to the next routine 902. The routine 902 reads from the transmitting buffer register the bit values indicated by the digit counter and the digit bit position counter (bit counter) in the transmitting buffer register and the transmitting output signal is set to the high or low level in accordance with the bit values. Then, a transfer is made to the next routine 903 and the value of the bit counter is decreased by 1. Then, a transfer is made to a decision step 904 for determining the value of the bit counter and it determines whether the value of the bit counter is zero. If the value is not zero, the processing of the routine 900 is completed. If the value is zero, a transfer is made to the next digit counter subtraction routine 905 and the digit counter is decreased by 1. Then, a transfer is made to the next decision step 906 for determining the value of the digit counter so that if the digit counter is zero, a transfer is made to a routine 907 and the transmitting data flag is reset. If the value of the digit counter is not zero, a transfer is made to a routine 908 for setting the bit counter to the predetermined value. In other words, so far as the data flag remains in the set state the data transmission routine 900 responds to the occurrence of each timer interrupt such that the display character code set in the transmitting buffer register is successively read out bit by bit and the transmitting output is set to the high or low level in accordance with the value, thereby transmitting the serial data to the display unit 7.

While, in the above-described embodiment, the occurrence of a plurality of malfunction contents in the control systems causes the single display 7a to selectively display them, its screen may be increased so as to display all the malfunction contents in a parallel manner. Further, while the command generating means comprises the first and second diagnosis switches 1a and 1b, audio recognition means may be used to generate display commands. Further, while the first and second diagnosis data are displayed when the second diagnosis switch 1b is closed, it is possible to arrange so that only the second diagnosis data are displayed in such a case. Further, while the first and second group flags for displaying the first and second diagnosis data are respectively reset at the expiration of 15 seconds and 20 hours, respectively, after the time of the last detection, the two flags may be reset in response to travel distance values of the vehicle. Still further, while the display unit is provided inside the vehicle compartment, the display unit may be used as an external display unit if it is connected to an external diagnostic system to make a diagnosis.

We claim:

1. A diagnostic monitoring system for a motor vehicle, comprising:

a plurality of control devices each separately controlling a part of said vehicle in accordance with a predetermined control program, each of said control devices including means for detecting abnormal operation of the respective control device in accordance with a diagnostic sub-program of said predetermined control program, and for generating abnormal operation signals in response to said detected abnormal operation signals in response to said detected abnormal operation;

central supervisory means, receiving said abnormal operation signals generated from said plurality of control devices, for separately storing abnormal operation data corresponding to said generated abnormal operation signals from each of said control devices in each of first and second memory areas, and for resetting abnormal operation data in said first memory area at a first predetermined time after a previous generation of abnormal operation signals, said reset abnormal operation data corresponding to a last generated abnormal operation signal, and for resetting the corresponding abnormal operation data in said second memory area at a second predetermined time which is longer than said first predetermined time;

command generating means for generating first and second commands to display first and second abnormal conditions; and display means, responsive to said first command from said command generating means, for displaying said first abnormal conditions in accordance with the abnormal operation data stored in said first memory area, and responsive to said second command from said command generating means, for displaying said second abnormal conditions in accordance with the abnormal operation data stored at least in said second memory area.

2. A system according to claim 1, wherein:
said display means respond to said second command from said command generating means to display abnormal conditions in accordance with abnormal operation data stored in both said first and second memory areas and to display a warning that the displayed abnormal operation conditions are continuously currently existing.

3. A system according to claim 1, wherein:
each of said plurality of control devices generates their respective abnormal operation signals and identifies a causal location for the abnormal operation;
said central supervisory means stores respective abnormal operation data, responsive to respective abnormal operation signals, in said first and second memory areas separately for each control device and separately for each identified causal location; and
said display means displays first and second abnormal conditions by displaying a first symbol representing the corresponding control device and displaying a second symbol representing the identified causal location of the corresponding abnormal operation.

4. A system according to claim 1, wherein:
said display means is responsive to abnormal operation data stored in said supervisory means to display a plurality of abnormal conditions for the display of said first or second abnormal conditions, and said display means displays said plurality of abnormal conditions sequentially in a predetermined order.

5. A system according to claim 1, wherein:
a selected number of said plurality of control devices each further include means for generating a condition signal indicative of the operating condition of their respective vehicle part; and
said display means displays the operating condition of said vehicle parts in accordance with said generated condition signals, and said display means responds to the first or second command from said command generating means to display the corresponding abnormal condition in substitution for the display of a respective vehicle part operating condition.

6. A system according to claim 1, wherein:
said supervisory means interprets relative significance of said stored abnormal operation data and recognizes data corresponding to abnormal conditions of predetermined high significance to cause said display means to display a corresponding warning.

7. A diagnostic monitoring system for a motor vehicle, comprising:
a plurality of control devices each separately controlling an object part of said vehicle in accordance with a predetermined control program, each of said control devices including means for detecting abnormal operation of the respective control device in accordance with a diagnostic sub-program of said control program, and for generating abnormal operation signals in response to said detections;
central supervisory means for receiving the abnormal operation signals generated by said plurality of control devices separately for each of said control devices, and for storing abnormal operation data corresponding to said generated abnormal operation signals separately for each of said control devices;
command generating means for generating commands to display abnormal conditions;
display means, responsive to said commands generated from said command generating means, for displaying said abnormal conditions in accordance with the abnormal operation data stored in said central supervisory means; and
resetting means for selectively resetting the abnormal operation data stored in said central supervisory means.

8. A system according to claim 7, wherein:
said central supervisory means stores said abnormal operation data in each of first and second memory areas separately for each of said control devices, resets abnormal operation data in said first memory area at a first predetermined time after the previous generation of abnormal operation signals wherein said reset data corresponds to said last-generated abnormal operation signal, and resets the corresponding data in said second memory area after a second predetermined time which is longer than said first predetermined time; and
said resetting means resets the abnormal operation data in said first and second memory areas in response to said first and second predetermined times.

9. A system according to claim 8, wherein:

said command generating means is user-controllable to generate first and second commands for display of first and second abnormal conditions; and said display means responds to said first command to display said first abnormal conditions in accordance with the abnormal operation data stored in said first memory area, and responds to said second command to display said second abnormal conditions in accordance with the abnormal operation data stored in at least said second memory area.

* * * * *